June 25, 1963  J. F. ENNIS ETAL  3,095,045
CULTIVATOR
Filed May 31, 1962  6 Sheets-Sheet 1
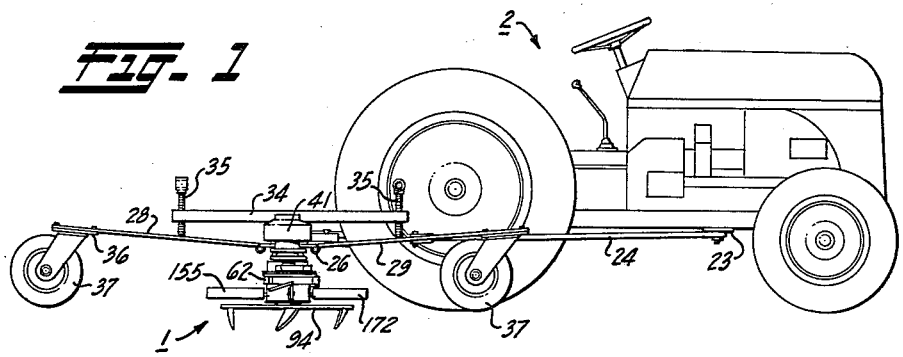
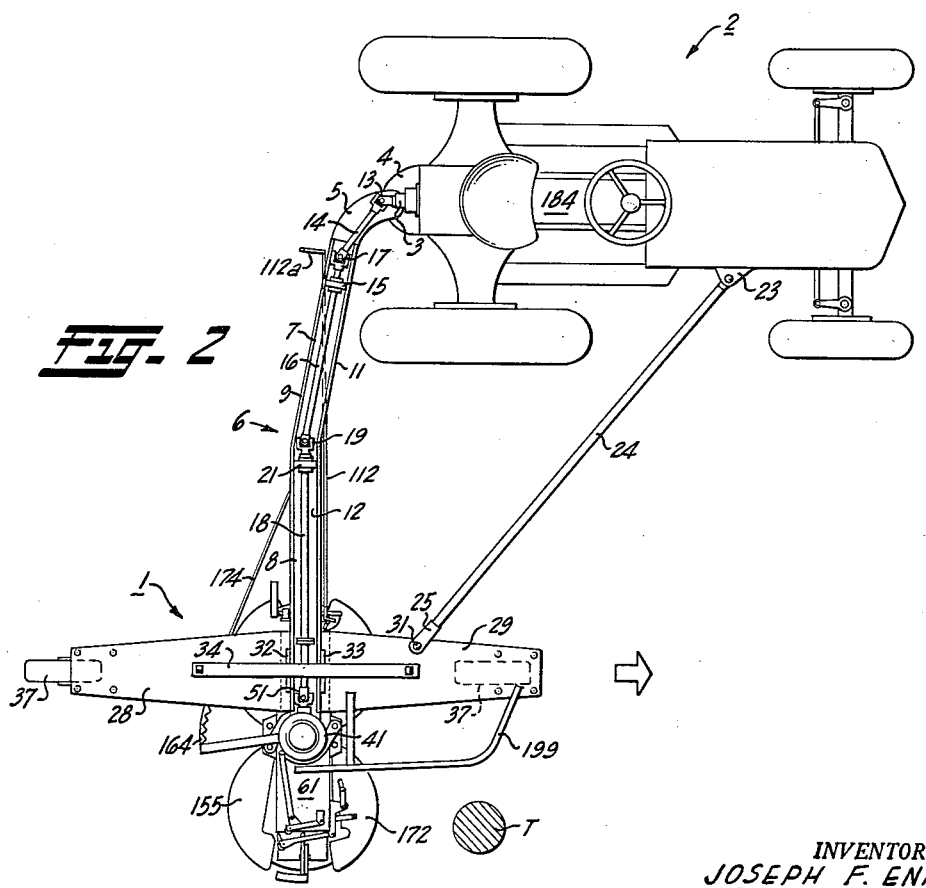
INVENTORS:
JOSEPH F. ENNIS
BRUCE A. PETERS
BY
Mellin and Hanscom
ATTORNEYS

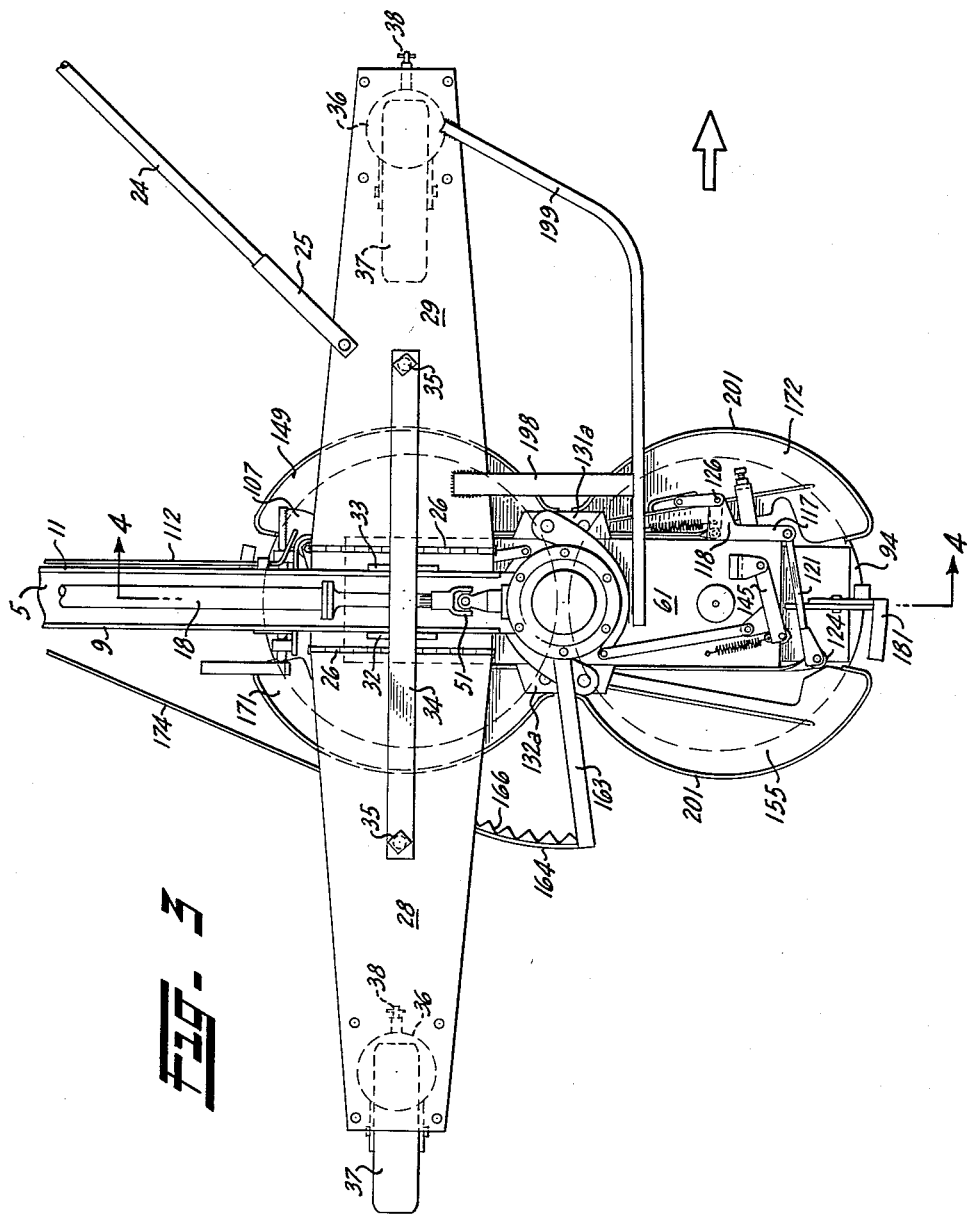

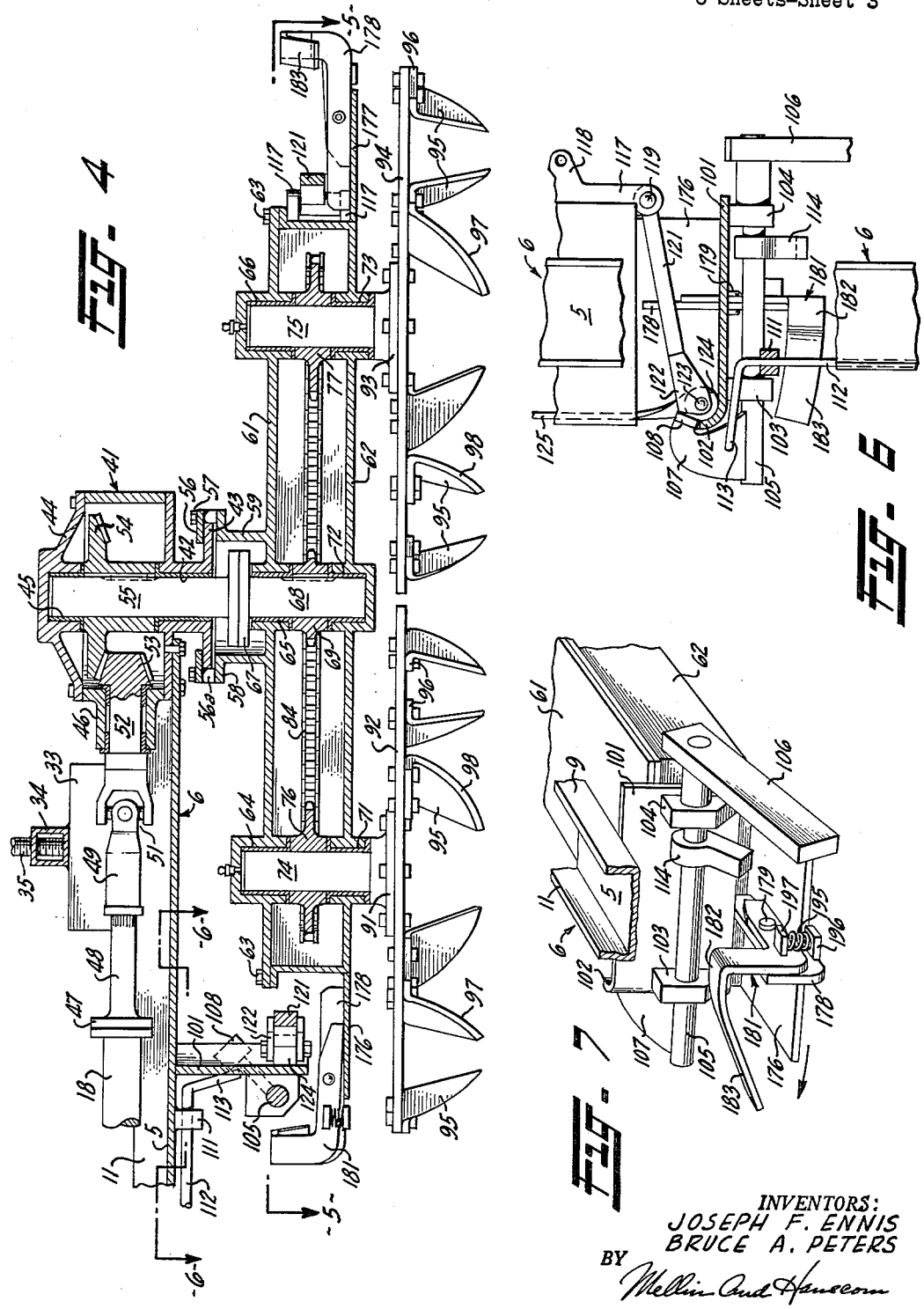

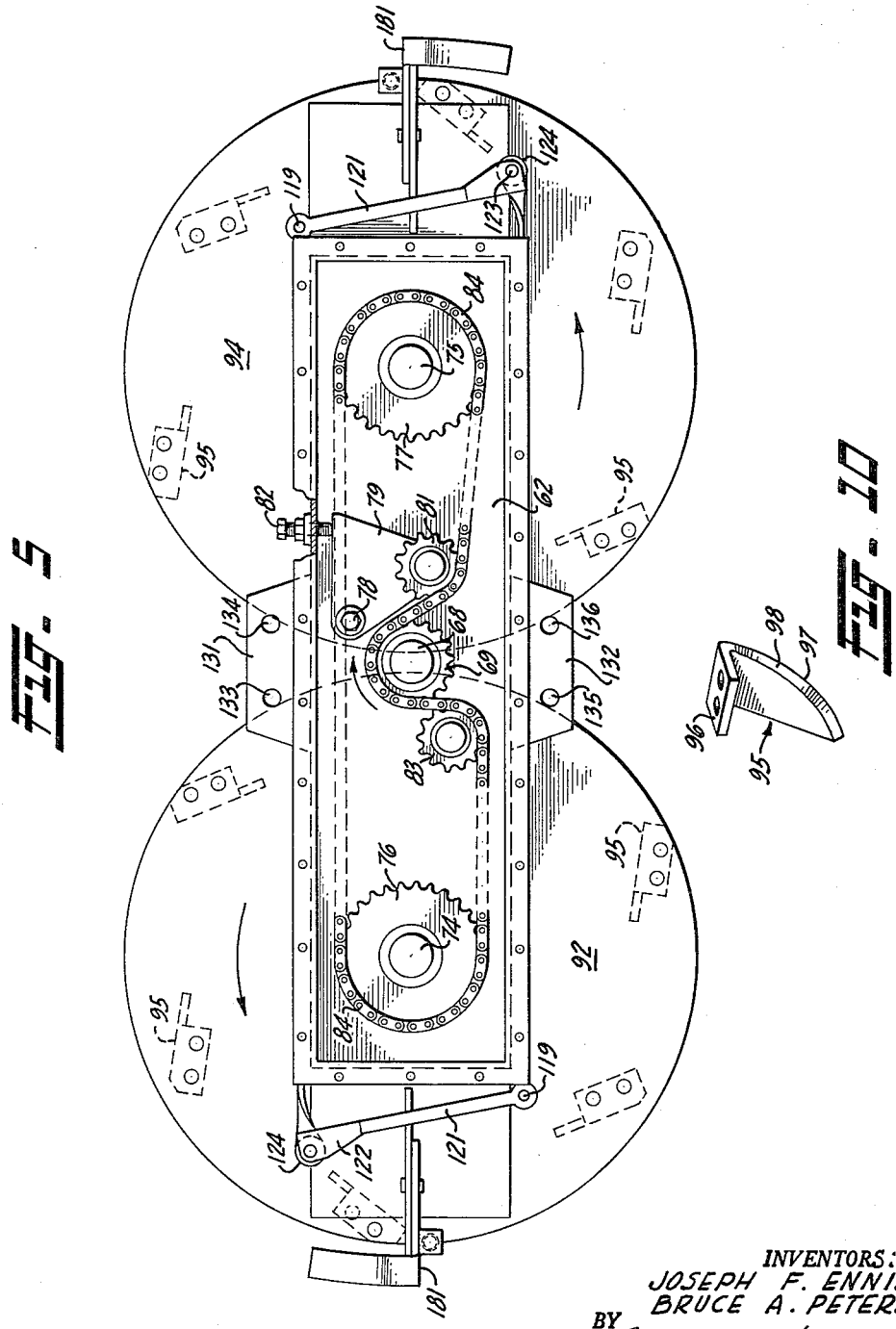

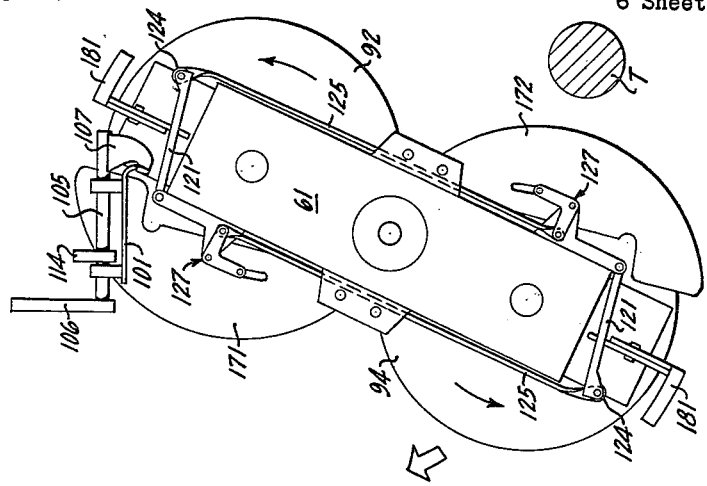
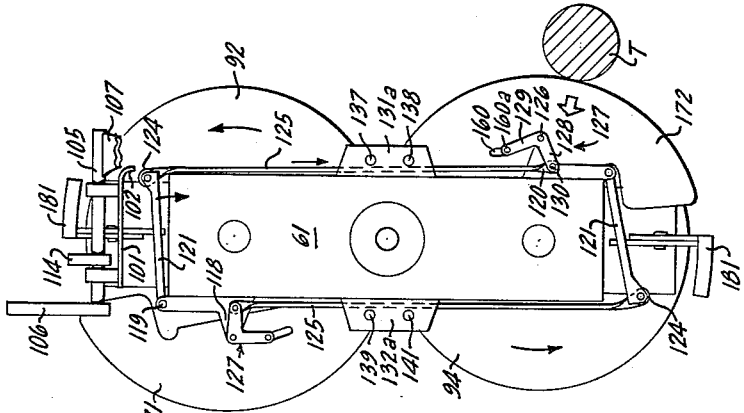
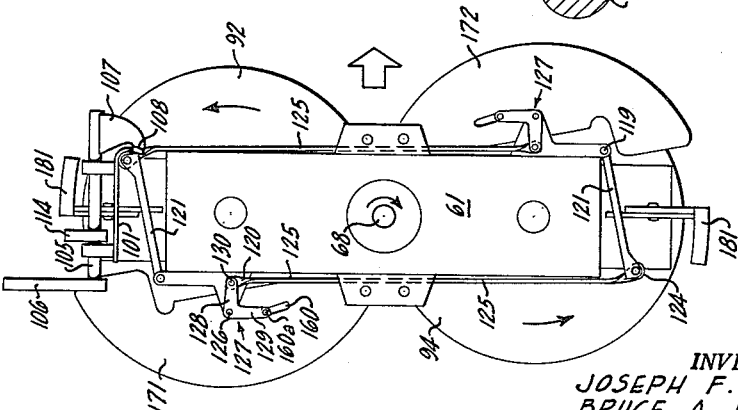
INVENTORS:
JOSEPH F. ENNIS
BRUCE A. PETERS
ATTORNEYS

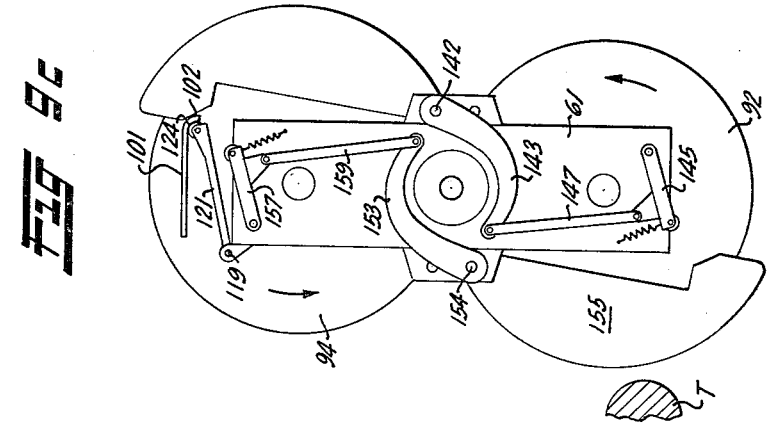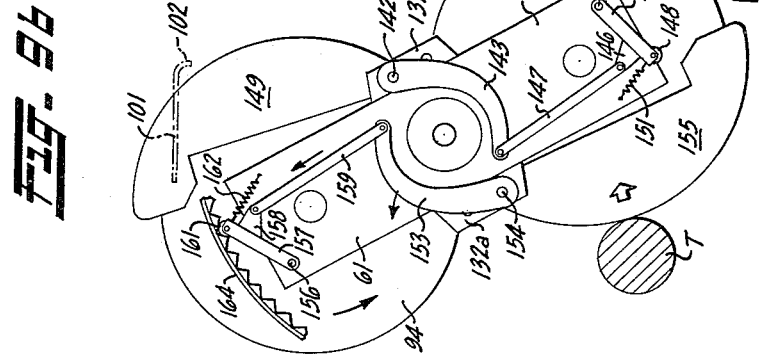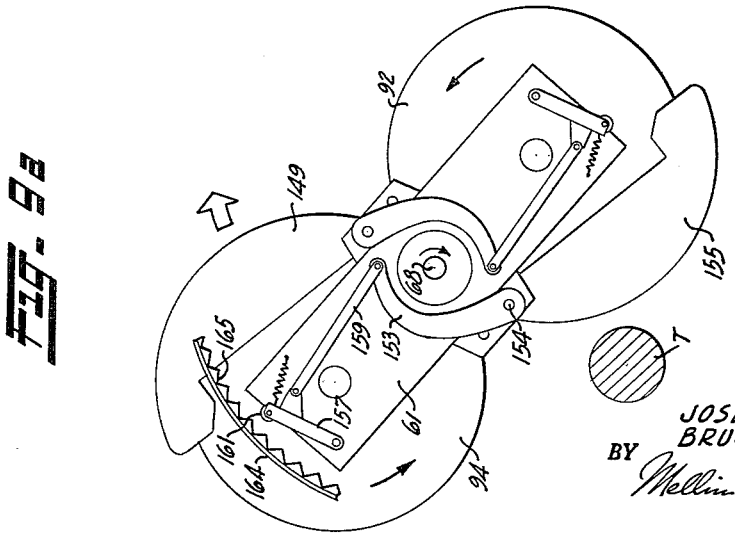

United States Patent Office 3,095,045
Patented June 25, 1963

3,095,045
CULTIVATOR
Joseph F. Ennis, Box 365, Lucerne, Calif., and Bruce A. Peters, Rte. 1, Box 667, Lakeport, Calif.
Filed May 31, 1962, Ser. No. 198,991
4 Claims. (Cl. 172—38)

This invention relates to and in general has for its object the provision of a cultivator capable of cultivating around a tree trunk.

More specifically, one of the objects of this invention is the provision of a cultivator including: a supporting frame arranged to be connected with a tractor for translation down a field in a position normal to the line of travel; a carriage for supporting said frame; a cultivator head journaled on the frame, first and second cultivator discs journaled respectively on each end of the disc; latching means for detachably locking either end of the cultivator head to the supporting frame and a pressure-responsive means for unlocking said latching means upon impact of said pressure-responsive means with a tree trunk, thereby to permit said cultivator head to rotate around the tree trunk.

Another object of this invention is the provision in a cultivator of the character above described of additional, normally retracted latching means for locking the cultivator head at an angle relative to the frame, and latch-releasing means carried by said cultivator head in a position to contact said tree upon the rearward rotation of the cultivator head back into the tree trunk and operable to lock said additional latching means upon impact of the releasing means with the tree trunk. This expedient is resorted to for the purpose of avoiding injury to the tree trunk.

Still another object of this invention is the provision in a cultivator of the character above described of manually operable means for positively locking the cultivator head to the frame and thus preventing its further rotation under the influence of the torque developed by the cultivator discs.

A further object of this invention is the provision of means varying the level of the free ends of the supporting frame and thus varying the depth of cut made by the cultivator discs.

Another object of this invention is the provision on the cultivator discs of self-sharpening teeth so oriented that the drag thereof through the dirt is reduced to a minimum.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is understood that it is not limited to such form, since the invention as set forth in the claims may be embodied in other forms.

Referring to the drawings:

FIG. 1 is a side elevation of a cultivator embodying the objects of my invention shown in its operative position attached to a tractor.

FIG. 2 is a top-plan view of the cultivator and tractor illustrated in FIG. 1.

FIG. 3 is an enlarged plan view of the cultivator per se as illustrated in FIGS. 1 and 2.

FIG. 4 is an enlarged midsection taken on the section line 4—4 of FIG. 3.

FIG. 5 is a section taken on the section line 5—5 of FIG. 4.

FIG. 6 is a fragmentary section taken on the section line 6—6 of FIG. 4.

FIG. 7 is a fragmentary perspective view of the structure shown in FIG. 6 but with portions thereof omitted so as to better illustrate its construction.

FIGS. 8a, 8b and 8c sequentially show the movement of the cultivator toward the trunk of a tree.

FIGS. 9a, 9b and 9c sequentially show the movement of the cultivator beyond the trunk of a tree.

FIG. 10 is a detail of one of the cultivator teeth.

*Tractor and Cultivator Power Subassembly*

As best illustrated in FIGS. 1, 2 and 3 the cultivator per se, generally designated by the reference numeral 1, is propelled and powered from a conventional tractor 2, including a power take-off shaft 3 and a rearwardly extending horizontal frame plate 4.

Pivoted to the frame plate 4 is the arcuate rear end of the bottom web 5 of an upwardly facing fabricated channel generally designated by the reference numeral 6. Comprising the channel 6 is a rear section 7, a forward section 8 disposed at right angles to the longitudinal axis of the tractor 2, and including upstanding side members 9 and 11 forming a trough 12.

Secured to the power take-off shaft 3 by a universal connection 13 is a shaft section 14 overlying the open rear portion of the channel web 5. Journaled in a bearing 15 mounted in the rear section 7 of the channel 6 is a shaft section 16 disposed within the confines of said channel. Securing the forward end of the shaft section 14 to the rear end of the shaft section 16 is a universal connection 17. Similarly disposed within the forward channel section 8 is a shaft section 18 connected to the forward end of the shaft section 16 by a universal connection 19. As in the case of the shaft section 16, the shaft section 18 is journaled in a bearing 21 mounted in the channel 6.

Secured to the tractor frame adjacent its forward end is a lug 23, and pivoted thereto is a strut 24 having a bifurcated end 25 which, as will be presently described, is arranged to be detachably secured to the cultivator per se 1, thereby to hold the cultivator in a fixed position.

Butt-welded to each of the sides 9 and 11 of the channel 6 adjacent the forward end thereof are piano hinges 26 merging with traction wheel-supporting plates 28 and 29. As best shown in FIG. 2, the bifurcated end 25 of the strut 24 straddles the plate 29 intermediate its ends and is fixed thereto by a removable pin or bolt 31. Welded to the outer faces of the channel sides 9 and 11 adjacent its outer end are upstanding plates 32 and 33 (FIG. 3) extending substantially above the level of the sides 9 and 11. Welded to and across the plates 32 and 33 is a stiff fabricated bar 34 of rectangular cross-section (FIG. 4). Threaded through each end of the bar 34 is a bolt 35, the lower end of said bolt being in engagement with the adjacent plate 28 or 29. As a result of this construction the inclination of the plates 28 and 29 relative to the channel 6 can be varied as desired. Journaled on the free end of each of the plates 28 and 29 is a fifth wheel 36, and carried thereby is a caster wheel 37 (FIG. 3). Fixed to each end of each of the plates 28 and 29 adjacent its fifth wheel 36 is a set screw 38 for fixing said wheel in any desired angular position. Since the caster wheels support the outer ends of the plates 28 and 29, advancing the bolts 35 downwardly through the bar 34 results in elevating the channel 6.

Bolted to the free end of the channel 6 is a gear housing 41 provided with a sleeve bearing 42 and with a flange 43. Bolted to the upper face of the housing 41 is a cap 44 formed with a bearing 45 coaxial to the sleeve bearing 42. Fixed to one side of the housing 41 is a sleeve bearing 46 in substantial alignment with the shaft section 18. Connected to the free end of the shaft section 18 by a coupling 47 is a subshaft 48, and splined thereto is a coupling shaft 49 connected by a universal joint 51 to a stub shaft 52 journaled in the bearing 46. Provided on the free end of the stub shaft 52 is a beveled gear 53 in mesh with a beveled gear 54 keyed to a stub shaft 55 journaled in the aligned bearings 42 and 45. Rotatably mounted on the flange 43 by arcuate plates 56, spacing members 56a, and bolts 57 is the flange 58 of a coupling housing 59 formed integral with the cover plate 61 of an elongated gear housing or cultivator head 62 of rectangular cross-section (FIG. 4). As shown in this figure, the cover plate 61 is bolted to housing 62 by bolts 63 and is formed integral with aligned bearings 64, 65 and 66. Connected to the lower end of the shaft 55 by a coupling 67 disposed within the coupling housing 59, is a stub shaft 68, and keyed thereto is a spur gear 69. As a result of this construction, the spur gear 69 can be driven from the stub shaft 52 through the beveled gears 53 and 54 and the gear housing 62 is free to rotate about the axis of the stub shaft 68 independently of the rotation of the spur gear 69.

Formed in the bottom of the gear housing 62 respectively in axial alignment with the bearings 64, 65 and 66 are bearings 71, 72, and 73, and journaled respectively in these three pairs of bearings are a stub shaft 74, the stub shaft 68 and a stub shaft 75. Fixed to the stub shaft 74 in the horizontal plane of the spur gear 69 is a spur gear 76, and similarly fixed to the stub shaft 75 in this same plane is a spur gear 77. Swiveled to the bottom of the gear housing 62 by a pin 78 (FIG. 5) is a plate 79, and journaled thereon in the plane of the spur gears 76, 69 and 77 is a take-up spur gear 81. Threaded through one side of the gear housing 62 adjacent an edge of the plate 79 is a take-up screw 82. Also journaled on the bottom of the gear housing 62 adjacent the spur gear 69 is an idler spur gear 83 (FIG. 5). Reeved around the outside of the spur gears 76, 83, 81 and 77 and around the inside of the spur gear 69 is a drive link chain 84. As a result of this construction the clockwise rotation of the drive spur gear 69 effects a counterclockwise rotation of the spur gear 76 and its stub shaft 74 and a counterclockwise rotation of the spur gear 77 and its stub shaft 75, leaving the gear housing 62 either stationary or free to rotate on the axis of the stub shaft 68 under the influence of some extraneous force.

Fixed to the lower end of the stub shaft 74 is a hub 91 (FIG. 4) and coaxially bolted thereto is a cultivator disc 92. Similarly fixed to the end of the stub shaft 75 is a hub 93, and bolted thereto is a second cultivator disc 94. Bolted around the periphery of each of the cultivator discs 92 and 94 are cultivator teeth 95 made of flat plates and provided with upset attaching flanges 96. Each tooth is provided with an arcuate cutting edge 97 lying in a vertical plane and with a beveled face 98 substantially tangential to its circular locus or path of travel. The flat body of each tooth therefore lies within this circle and inclined at a relatively small angle with respect to the line of tangency of its face 98 with said circle. As a result of this construction the cutting edge 97 is self-sharpening and the drag of the teeth through the dirt is reduced to a minimum.

Welded to the bottom 5 of the channel 6 above the left periphery of the cultivator disc 92, as illustrated in FIG. 4, is a depending keeper plate 101 having a hooked or arcuate keeper end 102. Fastened to the outer face of the keeper plate 101 adjacent its ends are bearing blocks 103 and 104, and journaled therein is a shaft 105. Fixed to the right end of the shaft 105 is a counterweight 106 and welded to its opposite end is a detent 107 having a T-flanged end 108 arranged to overlie the free end of the keeper end 102 (FIG. 6) when the shaft is rotated clockwise as viewed in FIG. 4. Journaled in a bearing block 111 welded to the channel bottom substantially above the shaft 105 is a rod 112 terminating at its right end as viewed in FIG. 4 in a latching finger 113 arranged to be rotated to a position over the detent 107 as shown in FIGS. 4 and 7. Also fixed to the shaft 105 intermediate the bearing blocks is a cam follower 114.

Welded to two diagonally opposed corners of the gear housing 62 are spaced, parallel, horizontally disposed bearing plates 117 formed at their inner ends with bearing ears 118 (FIGS. 3 and 6). Pivoted to and between the outer ends of each pair of parallel plates immediately adjacent one corner of the gear housing 62 by a pin 119 is a cam follower arm 121 terminating in a bifurcated free end 122. Fixed to the bifurcated end 122 is a pin 123, and journaled thereon is a roller 124 arranged to seat in the arcuate keeper end 102 of the plate 101 (FIG. 6) and to be locked therein by flange 108 of the detent 107. Also journaled on each of the pins 123 is the flat end 120 of a rod 125 generally paralleling one side of the gear housing 62.

Pivoted to each of the bearing ears 118 by a pin 126 is a bell crank generally designated by the reference numeral 127 and including arms 128 and 129. As shown in FIGS. 8a, 8b and 8c the free end of each arm 128 is pivoted by a pin 130 to the flat end 120 of one of the rods. As a result of this construction rotation of each of the bell cranks 127 about its pin 126 results in the longitudinal translation of its associated rod 125 and this in turn results in the movement of the roller 124 in or out of engagement with arcuate keeper end 102 of the keeper plate 101. Here it should be observed from FIGS. 5, 8a, 8b and 8c that each end of the gear housing 62 is provided with a cam follower rod 121 and an associated roller 124 disposed in a symmetrical arrangement. Since the gear housing 62 is free to rotate, either cam follower roller can come into engagement with the keeper end 102 of the single keeper plate 101 carried by the channel 6. Upon such engagement of the roller in the arcuate keeper end 102, the roller can be locked therein by the T-flanged end 108 of the detent 107 as a result of the rotation of the shaft 105. Furthermore, the detent 107 can be locked in this position by the latching finger 113 as a result of the rotation of the rod 112.

As best shown in FIG. 5, each side of the gear housing 62 is provided intermediate its ends and adjacent its bottom with a laterally extending bracket 131 and 132 provided respectively with bores 133, 134, 135 and 136. In FIGS. 8a, 8b, 8c, 9a, 9b and 9c the cover plate 61 of the gear housing 62 is shown in place, and is provided intermediate its ends with a laterally extending bracket 131a overlying the bracket 131 and on its opposite side with a similar bracket 132a overlying the bracket 132. Formed in the bracket 131a are bores 137 and 138, and likewise formed in the bracket 132a are bores 139 and 141.

Overlying the upper bracket 131a (FIGS. 3, 9a, 9b and 9c) and swiveled thereto by a pin 142 journaled in the bores 133 and 137 is an arcuate arm 143 overlying the gear housing cover plate 61 and partially surrounding the coupling housing 59. Here it should be noted that the arm 143 is rigidly fixed to the pin 142 for rotation therewith. Pivoted to one corner of the cover plate 61 by a pin 144 is an arm 145 provided adjacent its free end with an inwardly extending ear 146. Bridging the free end of the arcuate arm 143 and the ear 146 and pivoted to both of these members is a link 147. Journaled in the outer end of the arm 145 is a small roller 148. Disposed between the upper and lower brackets 131a and 132 and fixed to the pin 142 for rotation therewith is an arcuate tree-sensing trigger member 149 which, with the arcuate arm 143, forms a first-class lever. Attached to the free end of the arm 145 is one end of a tension spring 151, the other end of said spring being anchored to the cover plate 61.

Similarly, an arcuate arm 153 is fixed to a pin 154 journaled in the vertically aligned bores 141 and 136 of the cover plate brackets 132 and 132a. Extending between the vertically spaced brackets 132 and 132a and likewise fixed to the pin 154 for rotation therewith is the inner end of a second arcuate tree-sensing trigger member 155. The member 155 and the arm 153 also form a first-class lever. Pivoted to the cover plate 61 diagonally opposite the arm 145 and by a pin 156 is a second arm 157 provided on its end with an inwardly extending ear 158. Linking the ear 158 with the free end of the arm 153 is a link 159 pivoted to both of these members. Journaled on the free end of the arm 157 is a small roller 161, and also fixed to the end of the arm 157 is one end of a tension spring 162, the other end of said spring being anchored to the cover plate 61.

Attached to the outer end of the channel 6 and extending substantially normal thereto is a rigid bar 163, and welded to the outer end thereof is a stiff arcuate arm 164 (FIGS. 3, 9a and 9b). Formed on the inner face of the arm 164 are teeth 165 forming intervening valleys or notches 166. As best shown in FIGS. 9a and 9b, the arm 164 is coaxial with the stub shafts 55 and 68 and is located immediately adjacent the circular path of travel of the ends of the gear housing 62 and its cover plate 61. If, then, as shown in FIG. 9a the cultivator, rotating clockwise into a tree trunk T and as illustrated in FIG. 9b the right-hand tree-sensing and trigger member 155 contacts the tree T, the member 155 will be forced to rotate counterclockwise. As a result of this the arcuate arm 153 will also rotate counterclockwise and the small roller 161 will be forced into the immediately adjacent notch 165 of the arcuate arm 164. This locks the gear housing 62 and all parts carried thereby against further rotation until the entire cultivator has been translated forwardly a sufficient extent to relieve the trigger member 155 of pressure. At this point the tension spring 162 retracts the roller 161 from its confining notch 165, whereupon the gear housing 62 is free to rotate a further increment to the position shown in FIG. 9c. At this point the roller 124, carried by one of the arms 121 and which has been passing over the keeper plate 101, is engaged by the arcuate keeper end 102 and is locked there by the T-flange 108 of the detent 107. The same action would of course take place in the event that the diametrically opposed trigger member rotated into the tree trunk T. The trigger members 149 and 155 operate only when the cultivator has passed the tree and its right end is backing into the tree.

As shown in FIGS. 2 and 3, the cultivator is actually provided with a second and identical pair of diametrically opposed tree-sensing trigger members 171 and 172. This structure is carried by pins not shown but journaled in the bores 138, 139, 134 and 135 and underlies the bottom of the gear housing 62.

Each of the trigger members 171 and 172 is provided with a cam track slot 160 arranged to receive a cam follower pin 160a carried on each arm 129 of each of the bell cranks 127. Since the rollers 124 are actuated by the bell cranks 127, the depression of the trigger members 171 will retract the right-hand roller 124 as viewed in FIG. 8 and the depression of the right-hand trigger member 172 will retract the left-hand roller from arcuate keeper end 102 formed on the plate 101. The trigger members 171 and 172 are operative only when one of them contacts a tree when moving forwardly as shown in FIGS. 8a and 8b.

In FIGS. 8a, 8b and 8c the first diagonally opposed pair of trigger members 149 and 155 have been omitted for the sake of clarity and for the same reason FIGS. 9a, 9b and 9c omit the other pair of trigger members 171 and 172. The functions of these two pairs of trigger members are entirely different.

As shown in FIG. 3, the arcuate arm 164 is attached at its free end to the outer end of a strut 174, the other end of which is anchored to the channel 6.

Formed integral with the bottom of the gear housing 62 are end extensions 176 and 177 (FIG. 4). Welded to the upper face of each of these extensions is an elongated, upstanding rib 178 (FIGS. 4, 6 and 7). Pivoted to each rib 178 by a pin 179 and for limited rocking movement thereon, is an L-shaped rocker arm 181 terminating in a horizontal dwell cam surface 182 merging with an inclined cam surface 183. Here it should be recalled that the shaft 105 is mounted on the plate 101 and that the plate 101 is welded to the stationary channel 6. The gear housing bottom extensions 176 and 177, however, rotate with the gear housing 62 and consequently there can be relative rotational movement between these two assemblies. The location of the cam surfaces 183 and 182 is such that upon rotation of the gear housing in a clockwise direction as indicated in FIG. 7, the cam surface 183 engages the free end of the cam follower 114 and therefore causes the T-flange 108 to move behind the oncoming roller 124 and thus prevents the gear housing assembly from overtraveling the keeper end 102 due to its momentum. It will therefore be seen that the function of the T-flange 108 is merely precautionary. Here it is assumed that initially the gear housing end 176 was in a position to the right of the plate 107 and, as above stated, is rotating in a clockwise direction. The rotation of the shaft 105 also raises the counterbalance 106, but as soon as the cam dwell surface clears the cam follower the counterbalance 106 serves to return the cam follower 114 to its initial starting position and the detent 107 is likewise free to return to its inactive position provided that it is not restrained from so doing by the latching finger 113.

The rod 112 carrying the finger 113 is supported along the channel 6 and terminates in a handle 112a in close proximity to the tractor operator's station 184. The operator can then manually control the latching finger 113. By turning the finger 113 to a position in back of the T-flange 108, the roller 124 is locked within the arcuate keeper end 102. In this position the cultivator discs 92 and 94 are positively locked against rotation and can be translated forwardly without being rotated about the central axis of the cultivator as a result of the torque developed in passing through dense weeds.

Optionally, a pressure spring 195 (FIG. 7) is mounted between a first lug 196 fixed to the rib 178 and a second lug 197 fixed to the rocker arm 181. This merely serves to bias the rocker arm 181 upwardly and to compensate for any slight misalignment of the cam follower 114 with the cam surfaces of the rocker arm.

Welded to the hinged plate 29 (FIG. 3) adjacent its inner end is a bracket 198, and fixed to its outer end is a curved deflecting bar or rod 199. The opposite end of the rod 199 is welded to the free end of the plate 29. As a result of this structure the deflecting rod 199 serves to deflect relatively small trees from the central valley formed by either leading, laterally adjacent pair of trigger members.

To prevent the trigger members 149, 155, 172 and 174 from bruising trees upon impact with the latter, they are preferably faced with leather or fabric reinforced rubber belting 201 as indicated only in FIG. 3.

To transport the cultivator above described along a road or from one working area to another, strut 24 is disconnected and the caster wheels 37 are freed by retracting the set screws 38. The cultivator and its channel 6 are then swung through 90° to a position tracking the tractor 2.

The cultivating position of the machine is as indicated in FIG. 2, with the strut 24 holding the gear housing 62 normal to the line of travel of the tractor. The tree-sensing trigger members 149, 155, 171 and 172 are all held in their outer positions by the tension springs 151 and 162 with the rollers 148 and 161 out of engagement with valleys 166. However, one roller 124 carried by an arm 121 is seated in the arcuate end 102 of the plate 101 and thus the gear housing 62 and all the parts attached thereto are held in a position normal to the line of movement of the tractor. Also at this point the detent 107 is in its retracted inoperative position and the cam follower 114 is also in its lowermost position with its lower end in alignment with the lower end of the cam track surface 183. Optionally, the operator, by turning the rod 112, can raise the detent 107 through the action of the finger 113 so as to bring its T-flange 108 into engagement with the back of the roller 124 and thus positively locking the gear housing 62 and its associated parts against rotation about the central axis of the cultivator. This, however, is resorted to only when passing through dense weeds and to prevent the torque developed by the cultivator discs, in passing through such weeds, from disengaging the roller 124 from the arcuate end 102.

Power is then applied to beveled gear 53 so as to cause the cultivator discs 92 and 94 to rotate as the cultivator is progressing down a field. When a tree T is being approached, the operator makes sure that the latching finger 113 is retracted so that the detent will be returned by the counterbalance 106 to its retracted position. The cultivator should then be in the position shown in FIGS. 3 and 8a.

Upon the engagement of the leading adjacent trigger member 172 with the tree trunk T, the member 172 is depressed inwardly, actuates its associated bell crank 127 and retracts the roller 124 at the opposite end of the gear housing 62 from the arcuate keeper end 102. This frees the gear housing 62 and permits the cultivator assembly to rotate clockwise about its central axis as indicated in FIG. 8c. Here it should be noted that the operator must present only the right-hand end of the cultivator and that consequently the initial contact with the tree trunk can be had by only the trigger member 172 or by the diagonally opposed trigger member 171 if the cultivator has been rotated through 180°. The other pair of trigger members 149 and 155 can contact only the far side of the tree trunk. In the position shown in FIG. 8c, the cultivator is being translated forwardly and due to its prior impact with the tree trunk the gear housing 62 and its associated members are rotating clockwise. At all events, forward movement of the right-hand end of the cultivator is arrested while the cultivator is being translated past the tree trunk as indicated in FIG. 9a. By the time the cultivator reaches the position indicated in FIG. 9b, the cultivator has been rotated through an angle somewhat less than 180°, and if the rearward rotational movement of its right-hand side is greater than the forward translatory movement of the entire unit, the rear trigger member 155 will contact the forward side of the tree trunk. The resulting depression of the trigger member 155 serves to force the roller 161 into the immediately adjacent valley 165 of the stationary arm 164 and thus lock the unit in a position substantially normal to the line of travel of the tractor. In turning to this position the cam track surface 183 has passed beneath the cam follower 114, and the cam follower 114 rotates the detent 107 to position its T-flange 108 in front of the roller 124 and thus insure that there is no overtravel of the gear housing 62 and its associated parts.

In rotating through 180° the cultivator has tilled the soil closely around the left-hand side of the tree trunk T. The soil on the other side of the tree can be similarly tilled on the return trip of the cultivator.

Although the cultivator has been rotated through 180°, it is now again in a starting position, ready to cultivate around another tree trunk.

Here it should be noted that the gear housing or cultivator head 62 is held against rotation under the influence of the trigger members 149 and 155 for the purpose of avoiding further impact between them and the tree trunk, and thus prevent injury to the tree trunk.

Also, it should be noted that a cultivator of this character can be provided with three or more cultivator discs and that by so doing the dead spot between adjacent discs can be decreased.

We claim:
1. A cultivator for cultivating around one side of a tree trunk comprising:
   a supporting frame;
   an elongated carriage mounted on said frame;
   means for attaching said frame to a tractor for translating said frame in a direction normal to the line of travel of said tractor;
   an elongated cultivator head journaled intermediate its ends on said frame for rotation relative thereto about a vertical axis;
   a first cultivator disc journaled on said cultivator head adjacent one end thereof;
   a second cultivator disc journaled on said cultivator head adjacent the other end thereof;
   a power take-off carried by said cultivator head for driving said discs;
   first latching means mounted on said frame adjacent the path of travel of the ends of said cultivator head;
   a first mating latching means mounted at one end of said cultivator head for detachably locking said one end to said first latching means;
   a second mating latching means mounted on the other end of said cultivator head for detachably locking said other end to said first latching means;
   first pressure-responsive latch-releasing means mounted on said cultivator head and overlying one side of said first cultivator disc for releasing the said first mating latching means at the other end of the cultivator head in response to the impact of said first pressure-responsive means with a tree trunk during the forward translation of said cultivator head;
   second pressure-responsive latch-releasing means mounted on said cultivator head and overlying the diagonally opposite side of said second cultivator disc for releasing the said second mating latching means in response to the impact of said second pressure-responsive latch-releasing means with a tree trunk during the forward translation of said cultivator head;
   an indented arcuate latching member fixed to said frame laterally thereof and paralleling the locus of the ends of said cultivator head;
   third mating latching means mounted on said one end of the cultivator head adjacent said locus for detachably engaging said arcuate latching member;
   fourth mating latching means similarly mounted on said other end of said cultivator head for detachably engaging said arcuate latching member;
   means for resiliently biasing said third and fourth latching means in their retracted positions;
   third latch-releasing means mounted on said cultivator head opposite said first latch-releasing means and overlying said first cultivator disc, said third latch-releasing means functioning to lock one of said third or fourth mating latching means on said arcuate latching member in response to the contact of said third latch-releasing means with the trunk of a tree during the rotation of said cultivator head; and
   a fourth latch-releasing means similarly mounted on said cultivator head opposite said second latch-releasing means and overlying said second cultivator disc.
2. A cultivator as set forth in claim 1 and further including manually operable means carried by the inner end of said carriage for positively locking said first latching means to the adjacent mating latching means.
3. A cultivator for cultivating around a tree trunk comprising:
   a supporting frame;
   a carriage supporting said frame;
   a cultivator head journaled on said frame for rotation relative thereto about a vertical axis;
   ground-cultivating means journaled on said cultivator head;

a power take-off carried by said cultivator head for driving said ground-cultivating means;

first latching means mounted on said frame adjacent the path of rotation of said cultivator head relative to said frame;

first mating latching means mounted on said cultivator head for detachably engaging said first latching means to lock said cultivator head against rotation relative to said frame;

means resiliently biasing said first mating latching means into engagement with said first latching means;

pressure-sensitive latch-releasing means mounted on said cultivator head for releasing said first mating latching means in response to the impact of said pressure-sensitive latch-releasing means with a tree trunk during the forward translation of said cultivator head;

second latching means mounted on said frame adjacent the path of rotation of said cultivator head relative to said frame;

second mating latching means mounted on said cultivator head for detachable engagement with said second latching means to lock said cultivator head against rotation relative to said frame;

means resiliently biasing said second mating latching means out of engagement with said second latching means;

second pressure-sensitive latch-engaging means mounted on said cultivator head for engaging said second mating latching means and said second latching means in response to the continued contact of said pressure-sensitive latch-engaging means with a tree as a result of the rotation of said cultivator head rearwardly towards said tree trunk to lock said cultivator head to said frame and thus arrest further rotation of said cultivator head so long as said pressure-sensitive latch-engaging means is subjected to pressure against said tree trunk.

4. A cultivator as set forth in claim 3 wherein said second latching means comprises an indented arcuate latching member fixed to said frame and paralleling the path of rotation of said cultivator head relative to said frame for a substantial distance; and wherein said second mating latching means mounted on said cultivator head is arranged to engage any one of the indentations of said arcuate latching member whereby the cultivator head can be locked to said frame at various rotational angularities of said cultivator head relative to said frame.

References Cited in the file of this patent

UNITED STATES PATENTS 2,826,129    Olson _____ Mar. 11, 1958